United States Patent
Matsuda et al.

(10) Patent No.: US 11,016,626 B2
(45) Date of Patent: May 25, 2021

(54) INPUT DEVICE

(71) Applicant: ALPS ALPINE CO., LTD., Tokyo (JP)

(72) Inventors: Atsushi Matsuda, Miyagi (JP); Suguru Wada, Santa Clara, CA (US)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/774,195

(22) Filed: Jan. 28, 2020

(65) Prior Publication Data
US 2020/0257409 A1  Aug. 13, 2020

(30) Foreign Application Priority Data
Feb. 12, 2019  (JP) .............................. JP2019-022997

(51) Int. Cl.
*G06F 3/044* (2006.01)
*G06F 1/16* (2006.01)

(52) U.S. Cl.
CPC .......... *G06F 3/0448* (2019.05); *G06F 1/1633* (2013.01); *G06F 3/0444* (2019.05); *G06F 2203/04103* (2013.01); *G06F 2203/04802* (2013.01)

(58) Field of Classification Search
CPC .. G06F 3/0487; G06F 3/03547; G06F 1/1626; G06F 3/0338; G06F 3/04815; G06F 3/017; G06F 3/0346; G06F 3/011; G06F 3/0488; G06F 3/0304; G06F 3/038; G06F 3/044; G06F 2203/04108; G06F 2203/0381; G06F 3/002; G06F 3/0383; G06F 3/1423; G06F 2200/1637; G06F 2203/04802; H05K 2201/09181; H05K 3/403; H05K 3/3442; H05K 1/141; H05K 1/111; H05K 2201/049; H05K 1/118; H05K 1/147; H05K 1/117; H05K 3/42
See application file for complete search history.

(56) References Cited

U.S. PATENT DOCUMENTS

| | | | | |
|---|---|---|---|---|
| 5,262,777 A | * | 11/1993 | Low | G06F 3/0346 178/18.01 |
| 6,527,555 B1 | * | 3/2003 | Storm | G09B 27/08 434/130 |
| 6,597,347 B1 | * | 7/2003 | Yasutake | G06F 3/0338 345/173 |
| 7,013,435 B2 | * | 3/2006 | Gallo | G06F 3/04815 715/850 |
| 7,246,434 B1 | * | 7/2007 | Taylor | H05K 3/3442 29/852 |
| 7,800,592 B2 | * | 9/2010 | Kerr | G06F 1/1626 345/173 |
| 9,274,621 B2 | * | 3/2016 | Deng | G06F 3/033 |

(Continued)

FOREIGN PATENT DOCUMENTS

JP   2010-182201   8/2010

*Primary Examiner* — Sanjiv D. Patel
(74) *Attorney, Agent, or Firm* — IPUSA, PLLC

(57) ABSTRACT

An input device includes a detector that includes a base having a polyhedral shape and detection electrodes that are provided on some or all sides of the base and detect proximity of an operator, and a guide that has a shape surrounding the detector and guides an input operation performed by the operator.

9 Claims, 8 Drawing Sheets

(56) References Cited

U.S. PATENT DOCUMENTS

| | | | |
|---|---|---|---|
| 2003/0020986 A1* | 1/2003 | Pang | G02B 6/4246 |
| | | | 398/139 |
| 2003/0071784 A1* | 4/2003 | Sato | G06F 3/0446 |
| | | | 345/156 |
| 2006/0000638 A1* | 1/2006 | Levine | H01L 23/49805 |
| | | | 174/260 |
| 2007/0247439 A1* | 10/2007 | Daniel | G06F 1/1607 |
| | | | 345/173 |
| 2011/0069460 A1* | 3/2011 | Clayton | H05K 1/118 |
| | | | 361/749 |
| 2015/0015481 A1* | 1/2015 | Li | G06F 3/017 |
| | | | 345/156 |
| 2018/0113531 A1* | 4/2018 | Na | G06F 3/0412 |
| 2018/0121153 A1* | 5/2018 | Lee | G09G 3/003 |
| 2018/0189014 A1* | 7/2018 | Patil | G06F 3/0416 |

* cited by examiner

INPUT DEVICE

CROSS-REFERENCE TO RELATED APPLICATION

The present application is based upon and claims priority to Japanese Patent Application No. 2019-022997, filed on Feb. 12, 2019, the entire contents of which are incorporated herein by reference.

BACKGROUND OF THE INVENTION

1. Field of the Invention

An aspect of this disclosure relates to an input device.

2. Description of the Related Art

A known detection device detects the proximity of an object using three-dimensionally arranged sensors. For example, Japanese Laid-Open Patent Publication No. 2010-182201 discloses an input device that detects the proximity of operator's fingers using detection electrodes of multiple capacitive sensors provided on a surface of a hemispherical three-dimensional structure.

With the input device disclosed in Japanese Laid-Open Patent Publication No. 2010-182201, when the shape of the three-dimensional structure providing an operation surface is changed to use the input device for a different purpose, it is necessary to rearrange multiple sensors on the operation surface of the three-dimensional structure whose shape has been changed. Accordingly, with the technology disclosed in Japanese Laid-Open Patent Publication No. 2010-182201, it is difficult to adapt an input device capable of receiving three-dimensional input operations for various purposes.

SUMMARY OF THE INVENTION

In an aspect of this disclosure, there is provided an input device including a detector that includes a base having a polyhedral shape and detection electrodes that are provided on some or all sides of the base and detect proximity of an operator, and a guide that has a shape surrounding the detector and guides an input operation performed by the operator.

DESCRIPTION OF THE PREFERRED EMBODIMENTS

Figure 1:
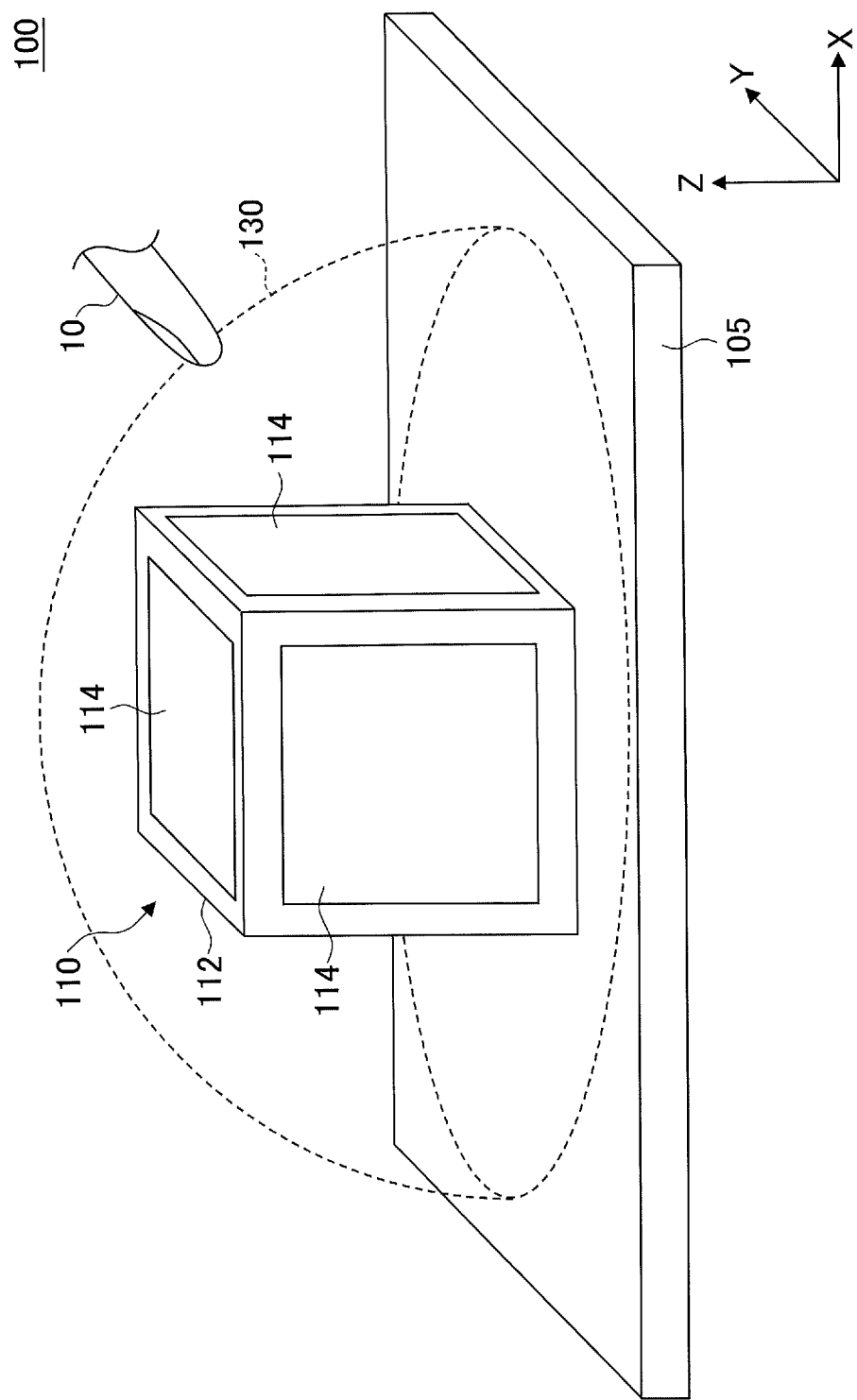
FIG. 1 is a perspective view of an input device according to an embodiment.

Embodiments of the present invention are described below with reference to the accompanying drawings. In the descriptions below, the Z-axis direction in the drawings is a vertical direction, the Y-axis direction in the drawings is a longitudinal direction, and the X-axis direction in the drawings is a lateral direction.

<Outline of Input Device>

Figure 2:
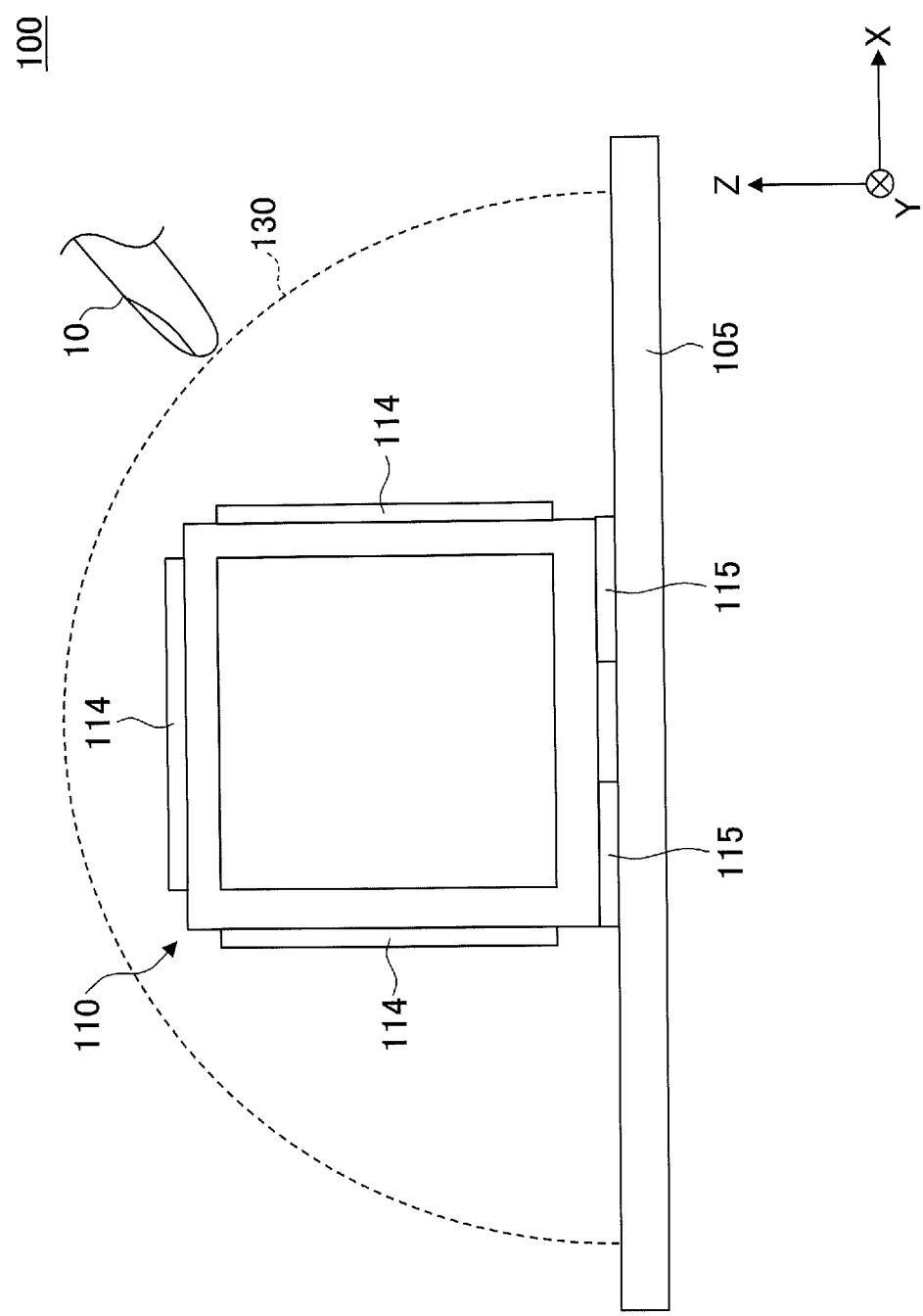
FIG. 2 is a front view of the input device.

FIG. 1 is a perspective view of an input device 100 according to an embodiment. FIG. 2 is a front view of the input device 100. The input device 100 receives input operations performed by an operator 10 (a person, a part of a person's body, or a thing that operates the input device 100). For example, the input device 100 is used to perform various input operations on a target device such as a terminal, a game machine, or an on-vehicle device.

As illustrated in FIG. 1, the input device 100 includes a circuit board 105, a detector 110, and a guide 130.

The circuit board 105 is an example of a "second board". The circuit board 105 is a plate-like part on a surface of which various electrical components such as the detector 110, the guide 130, and a detection circuit 140 are mounted. The circuit board 105 may be implemented by a printed circuit board (PCB) formed of, for example, a glass epoxy board.

The detector 110 includes a base 112 and multiple detection electrodes 114. The base 112 is a three-dimensional structure having a polyhedral shape. In the present embodiment, the base 112 has a regular hexahedral (or cubical) shape. That is, the base 112 includes multiple sides having a square shape in plan view.

The detection electrodes 114 are provided on some or all of the sides of the base 112. In the present embodiment, the detection electrode 114 is provided on each of five sides (top side and four lateral sides) of the base 112. Each detection electrode 114 detects the proximity of the operator 10 to the detection electrode 114. In the present embodiment, the detection electrode 114 detects the proximity of the operator 10 by using an electrostatic capacitance system. The detection electrode 114 may be implemented by a thin film conductor formed of, for example, indium tin oxide (ITO), indium zinc oxide (IZO), or a metal film (e.g., a composite of silver, copper, aluminum, and molybdenum).

The guide 130 covers the base 112. In the example of FIG. 1, the guide 130 is shaped like a dome that protrudes upward. The guide 130 guides input operations performed by the operator 10. For example, the guide 130 guides an input operation where the operator 10 touches the surface of the guide 130 and an input operation where the operator 10 moves along the surface of the guide 130. The guide 130 is formed of an elastic material (e.g., rubber or silicon) and is therefore elastically deformable. With this configuration, in addition to an input operation along the surface of the guide 130, the guide 130 enables an input operation that involves elastic deformation of the guide 130 (e.g., an input operation of denting the guide 130).

When an input operation (an input operation on the surface of the guide 130) is performed by the operator 10, the input device 100 can obtain information on the input operation (for example, a contact position, a moving direction, and a moving distance of the operator 10) by detecting changes in the capacitance corresponding to the proximity of the operator 10 using the detection electrodes 114. In FIG.

1, an operator's finger is illustrated as an example of the operator 10. However, the operator 10 is not limited to this example.

<Electrical Connections Among Components of Input Device>

Figure 3:
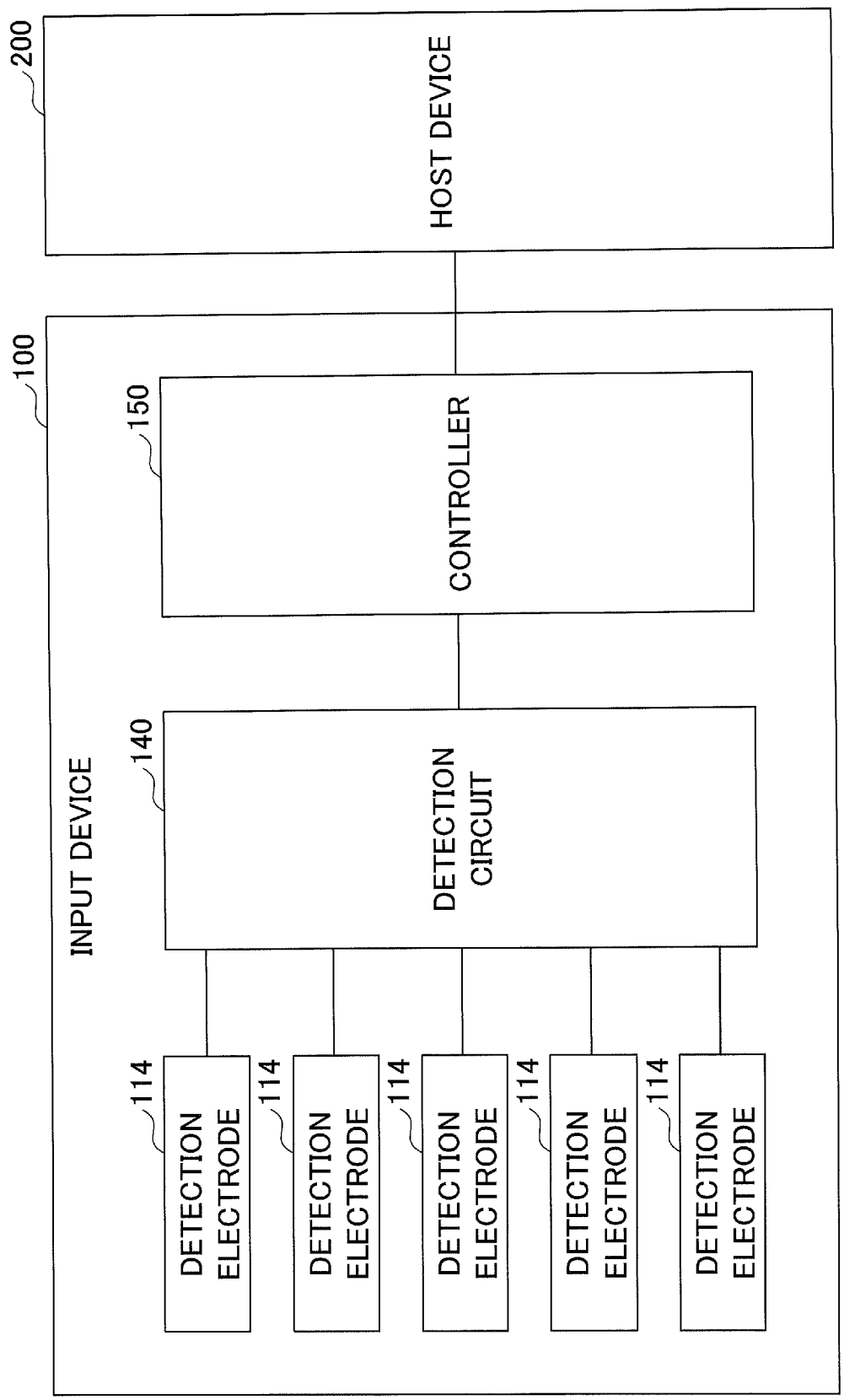
FIG. 3 is a block diagram illustrating electrical connections among components of the input device.

FIG. 3 is a block diagram illustrating electrical connections among components of the input device 100. As illustrated in FIG. 3, the input device 100 includes multiple detection electrodes 114, a detection circuit 140, and a controller 150. Each detection electrode 114 is electrically connected to the detection circuit 140. Also, the detection circuit 140 is electrically connected to the controller 150.

The detection electrode 114 is driven by an alternating voltage applied by the detection circuit 140, and the current value of the detection electrode 114 changes as the capacitance varies depending on the proximity of the operator 10. The capacitance (i.e., a current value corresponding to the proximity) of the detection electrode 114 is detected by the detection circuit 140. The detection circuit 140 outputs the detected capacitance of each detection electrode 114 to the controller 150.

The controller 150 detects an input operation performed by the operator 10 on the input device 100 based on changes in the capacitance of the detection electrodes 114 detected by the detection circuit 140. For example, the controller 150 detects a contact position of the operator 10 on the surface of the guide 130 based on changes in the capacitance of the detection electrodes 114. The controller 150 outputs information (e.g., coordinates) indicating the detected contact position of the operator 10 to a host device 200. For example, the controller 150 calculates distances from each of the detection electrodes 114 to the contact position of the operator 10 based on changes in the capacitance of the detection electrodes 114. Then, the controller 150 identifies the contact position of the operator 10 using a known triangulation method based on the distances from each of the detection electrodes 114 to the contact position of the operator 10.

The host device 200 identifies an input operation (such as a touch operation or a slide operation) performed by the operator 10 based on the contact position of the operator 10 output from the controller 150 and performs an application process (such as an input process, a selection process, a moving process, a switching process, a magnification process, a reduction process, or a volume adjustment process) corresponding to the input operation.

For example, the input device 100 detects a contact position of the operator 10 at regular intervals, and each time the contact position of the operator 10 is detected, the controller 150 of the input device 100 outputs information indicating the contact position to the host device 200. With this configuration, the controller 150 can identify consecutive input operations performed by the operator 10.

<Configuration of Detector of Input Device>

Figure 4:
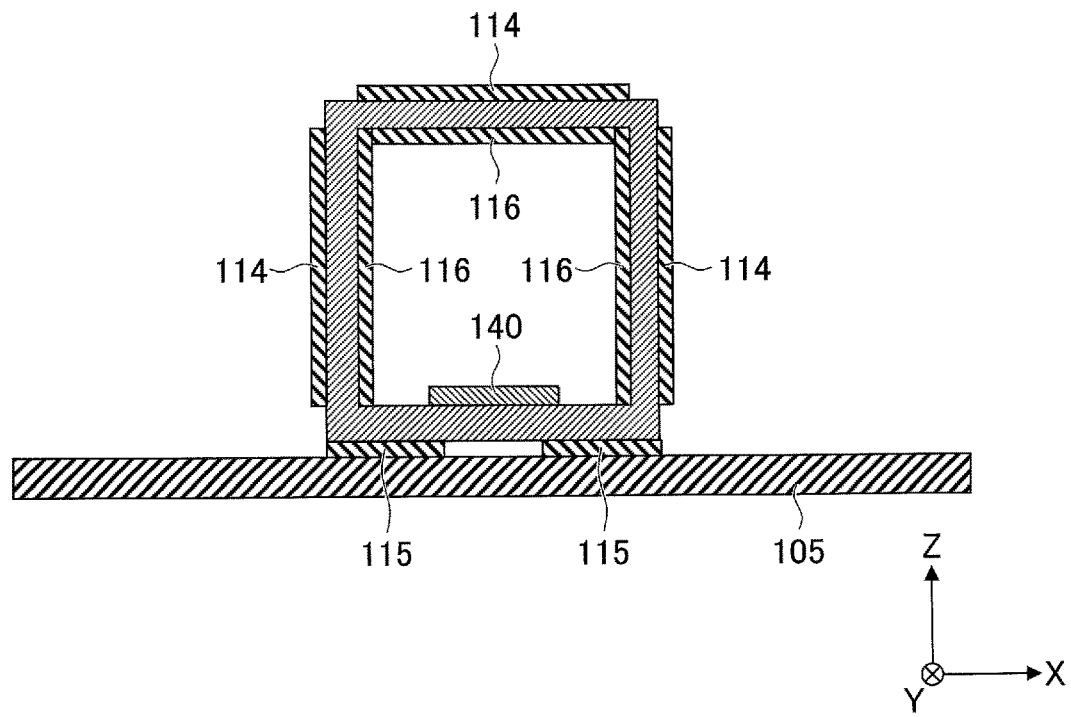
FIG. 4 is a cross-sectional view illustrating a configuration of a detector of the input device.

FIG. 4 is a cross-sectional view (XZ-plane cross section) illustrating a configuration of the detector 110 of the input device 100. As illustrated in FIG. 4, the detector 110 of the input device 100 is placed on a surface of the circuit board 105. The detector 110 is electrically connected by soldering to connection terminals 115 provided on the surface of the circuit board 105. The base 112 constituting a part of the detector 110 has a hollow cubic shape. The detection electrodes 114 are provided on the outer surfaces of the walls (top wall and side walls) of the base 112. The detection circuit 140 is provided in the internal space (on the inner surface of the bottom wall) of the base 112.

Also, shield electrodes 116 are provided on the inner surfaces of the walls (top wall and side walls) of the base 112. That is, the shield electrodes 116 are provided behind the corresponding detection electrodes 114. The shield electrodes 116 are electrically connected to the detection circuit 140. The detection circuit 140 applies a shield signal with a waveform synchronized with a driving signal for driving the detection electrode 114 to drive the shield electrode 116 to have the same potential as the detection electrode 114. With this configuration, the shield electrode 116 shields the backside of the detection electrode 114 and suppresses variation in the capacitance of the detection electrode 114 caused by, for example, noise from the detection circuit 140.

<Variation of Configuration of Detector of Input Device>

Figure 5:
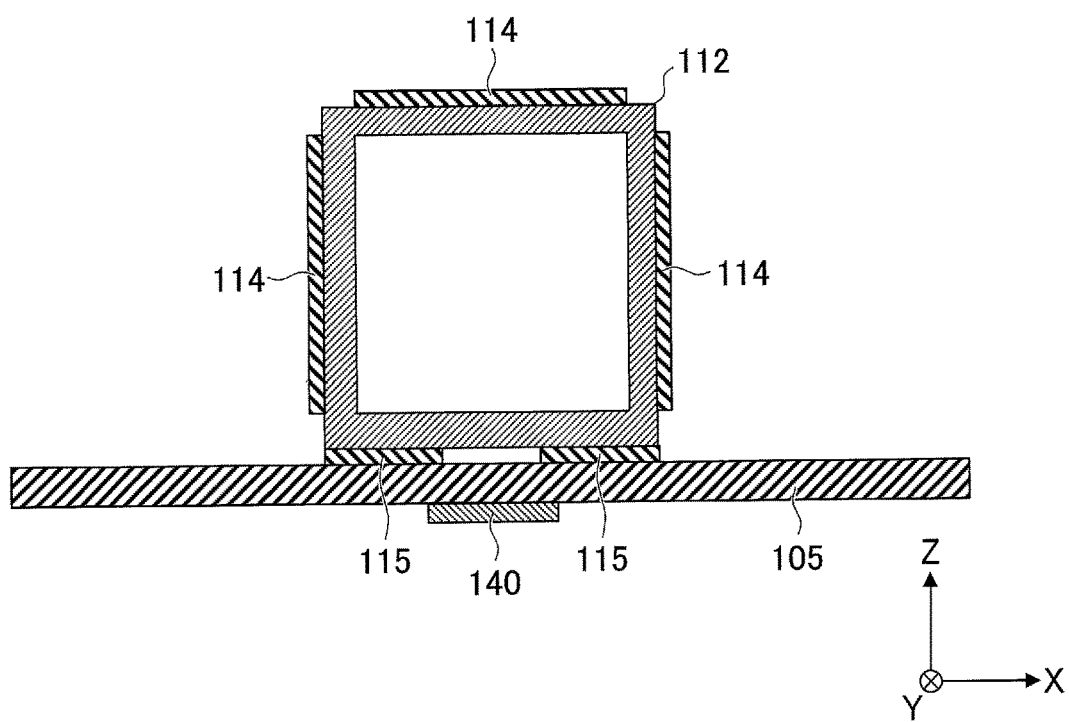
FIG. 5 is a cross-sectional view illustrating a variation of the configuration of the detector of the input device.

FIG. 5 is a cross-sectional view (XZ-plane cross section) illustrating a variation of the configuration of the detector 110 of the input device 100. In the variation illustrated in FIG. 5, no shield electrode 116 is provided on the inner surfaces of the walls (top wall and side walls) of the base 112. Also, in the variation illustrated in FIG. 5, the detection circuit 140 is not provided in the internal space (on the inner surface of the bottom wall) of the base 112. Instead, in the variation illustrated in FIG. 5, the detection circuit 140 is provided on the back (or lower) surface of the circuit board 105. This configuration makes it possible to suppress variation in the capacitance of the detection electrode 114 caused by, for example, noise from the detection circuit 140.

In the variation illustrated in FIG. 5, the detection electrodes 114 can be used as shield electrodes. For example, when the detection of the operator 10 is performed by one of the detection electrodes 114, the application of shield signals to the other detection electrodes 114 makes it possible to suppress variation in the capacitance of the one of the detection electrodes 114 caused by, for example, noise from the other detection electrodes 114.

The detection circuit 140 may be provided inside of the base 112, on the circuit board 105, or outside of the circuit board 105. Also, the controller 150 may be provided inside of the base 112, on the circuit board 105, or outside of the circuit board 105.

<Configuration of Boards of Detector>

Figure 6:
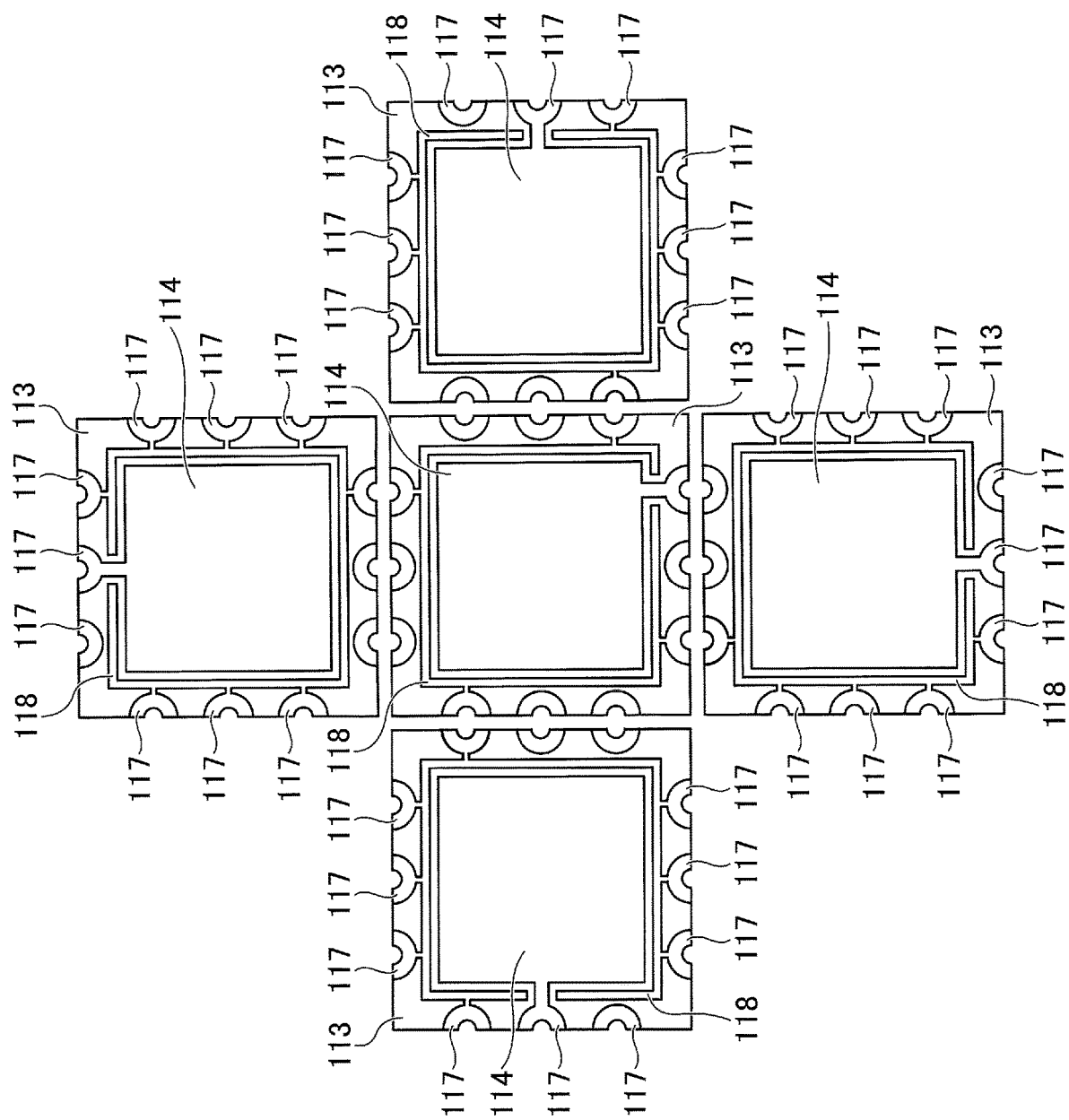
FIG. 6 is a drawing illustrating a configuration of boards of the input device.
Figure 7:
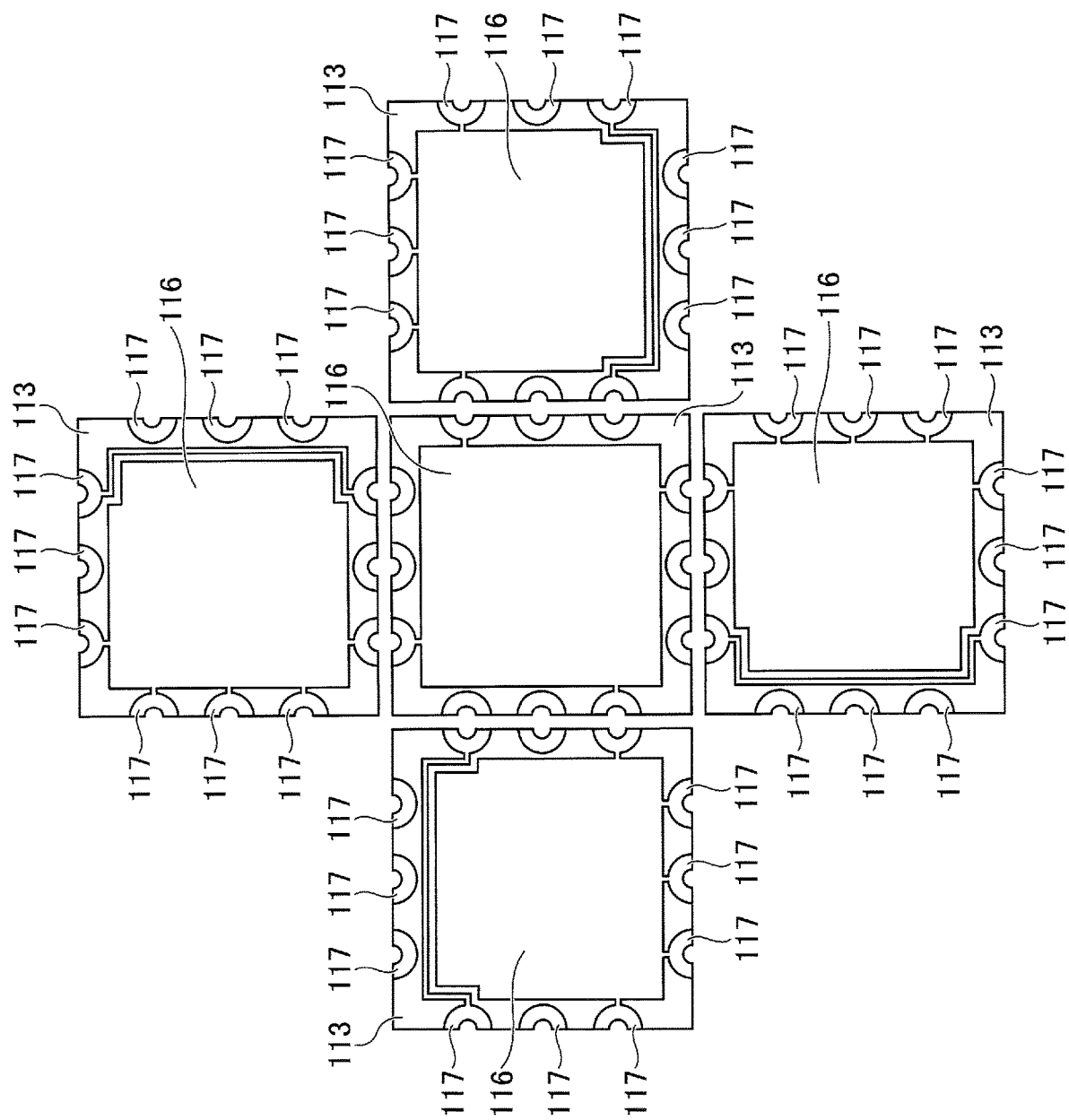
FIG. 7 is a drawing illustrating a configuration of the boards of the input device.

FIGS. 6 and 7 are drawings illustrating a configuration of boards 113 of the input device 100. Each of FIGS. 6 and 7 illustrates five boards 113 of the detector 110 that are unfolded. FIG. 6 illustrates the outer surfaces of the boards 113. FIG. 7 illustrates the inner surfaces of the boards 113.

As illustrated in FIGS. 6 and 7, the detector 110 includes multiple boards 113. Each board 113 has a square shape in plan view. The board 113 may be implemented by a printed circuit board (PCB) formed of, for example, a glass epoxy board. As illustrated in FIG. 6, the detection electrode 114 having a square shape in plan view is provided on the outer surface of the board 113. Also, as illustrated in FIG. 7, the shield electrode 116 having a square shape in plan view is provided on the inner surface of the board 113.

As illustrated in FIGS. 6 and 7, three connectors 117 are arranged along each edge of the board 113. Each connector 117 has a semi-circular shape in plan view. The connector 117 is formed by dividing a through hole formed across two boards 113 along the edges of the boards 113. The surface of the connector 117 is covered by a metal film to enable soldering.

A portion of the connector 117 exposed on the outer surface of the board 113 and a portion of the connector 117 exposed on the inner surface of the board 113 are electrically connected to each other via a metal film covering the inner circumferential surface of the through hole. Also, in the board 113, the detection electrode 114 is connected to one of the connectors 117 via a wiring pattern. With this configuration, the detection electrode 114 can be connected to a component (e.g., another board 113, the circuit board 105, etc.) outside of the board 113 via the connector 117.

On the outer surface of the board 113, a strip-shaped shield electrode 118 is provided outside of the detection electrode 114 and extends along the outer periphery of the detection electrode 114. When the boards 113 are joined together, multiple shield electrodes 118 are electrically connected to each other via the connectors 117. Accordingly, when one or more connectors 117 connected to one of the shield electrodes 118 are connected to the circuit board 105, all of the shield electrodes 118 are electrically connected to the circuit board 105 and can be driven at once.

<Connection of Boards of Detector>

Figure 8:
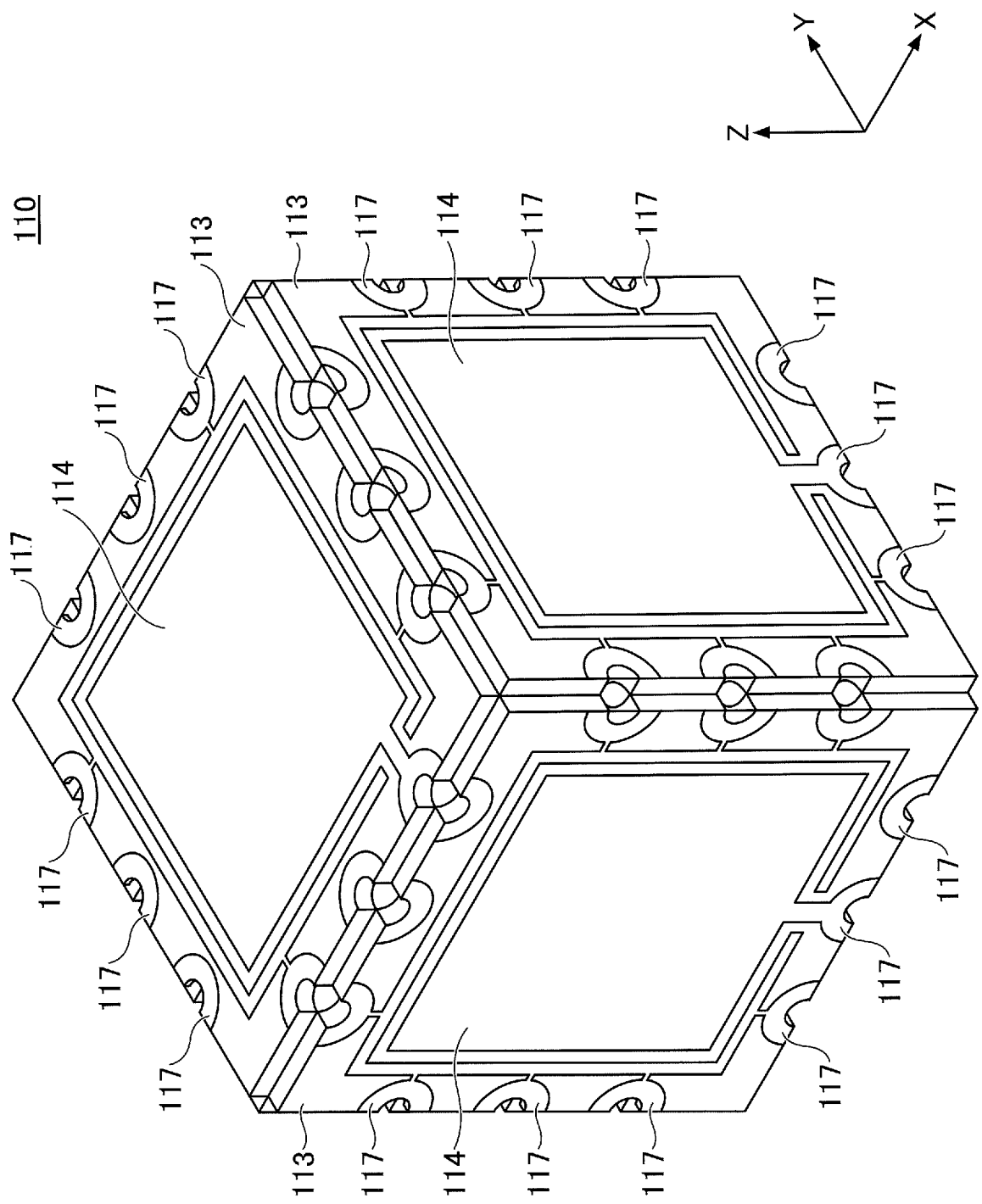
FIG. 8 is a perspective view of the detector of the input device.

FIG. 8 is a perspective view of the detector 110 of the input device 100 according to the embodiment. As illustrated in FIG. 8, the base 112 has a regular hexahedral shape and is formed by three-dimensionally assembling the boards 113. Specifically, four vertically-oriented boards 113 are assembled in a square cylindrical shape to form four side walls of the base 112. Then, two horizontally-oriented boards 113 are joined, respectively, to the upper ends and the lower ends of the sidewalls to form the upper wall and the bottom wall of the base 112. As a result, the base 112 having a cubic shape is formed as illustrated in FIG. 8.

Here, as illustrated in FIG. 8, in each pair of adjacent boards 113 of the base 112, three connectors 117 provided at an edge of one of the adjacent boards 113 and three connectors 117 provided at an edge of the other one of the adjacent boards 113 face each other. The three connectors 117 of one of the adjacent boards 113 are soldered to the three connectors 117 of the other one of the adjacent boards 113. With this configuration, the adjacent boards 113 of the base 112 are fixed to each other and are electrically connected to each other.

When the detector 110 is mounted on a surface of the circuit board 105, one or more of the connectors 117 at a lower edge (i.e., an edge facing the surface of the circuit board 105) of at least one of the boards 113 are soldered to the connection terminal(s) 115 provided on the surface of the circuit board 105, and the detector 110 is thereby electrically connected to the circuit board 105.

<Variation of Configuration of Guide of Input Device>

Figure 9:
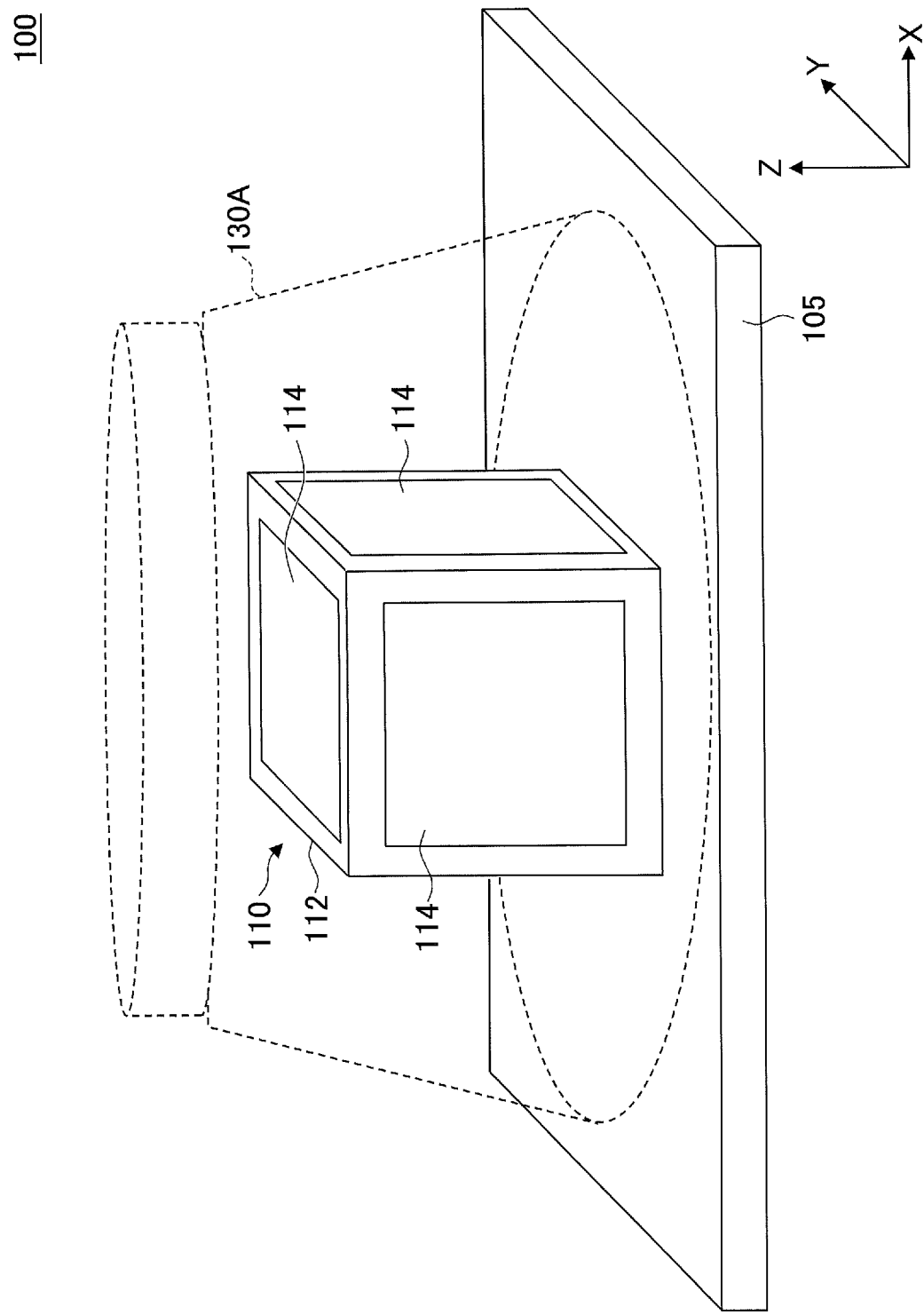
FIG. 9 is a perspective view of a variation of a guide of the input device.

FIG. 9 is a perspective view of a variation of the guide 130 of the input device 100 according to the embodiment. Different from the input device 100 illustrated in FIG. 1, the input device 100 illustrated in FIG. 9 includes a guide 130A instead of the guide 130.

The input device 100 of the present embodiment is configured such that the guide 130 and the guide 130A with different shapes are replaceable with each other. When the guide 130 is replaced with the guide 130A, the operator 10 can perform input operations corresponding to the shape of the guide 130A. Components (such as the detector 110 and the circuit board 105) other than the guide 130A of the input device 100 illustrated in FIG. 9 are the same as those of the input device 100 illustrated in FIG. 1. That is, the input device 100 of the present embodiment can be used for various purposes by simply changing the shape of the guide 130.

As described above, the input device 100 of the present embodiment includes the detector 110 that includes the base 112 having a polyhedral shape and the detection electrodes 114 provided on some or all of the sides of the base 112 and configured to detect the proximity of the operator 10, and the guide 130 having a shape surrounding the detector 110 and configured to guide input operations performed by the operator 10.

This configuration of the input device 100 of the present embodiment makes it possible to replace the guide 130 with a different guide having a different shape without changing the detector 110 and to enable the operator 10 to perform input operations corresponding to the shape of the different guide. Accordingly, the above configuration makes it possible to easily adapt an input device capable of receiving three-dimensional input operations for various purposes.

Also, the guide 130 of the input device 100 of the present embodiment is elastically deformable.

With this configuration, in addition to an input operation along the surface of the guide 130, the guide 130 enables an input operation that involves elastic deformation of the guide 130 (e.g., an input operation of denting the guide 130). Thus, the present embodiment makes it possible to provide an input device capable of receiving a greater variety of input operations.

In the input device 100 of the present embodiment, the base 112 is formed by three-dimensionally assembling flat boards 113 on which the detection electrodes 114 are provided.

With this configuration of the input device 100 of the present embodiment, the base 112, on the sides of which the detection electrodes 114 are provided, is formed by just three-dimensionally assembling the boards 113, and it is not necessary to perform a separate step to place the detection electrodes 114 on the sides of the base 112. Accordingly, this configuration of the input device 100 makes it possible to easily assemble the detector 110.

In the input device 100 of the present embodiment, the connectors 117 are provided on the periphery of each of the boards 113. In each pair of adjacent boards 113, the connectors 117 of one of the adjacent boards 113 are soldered to the connectors 117 of the other one of the adjacent boards 113. As a result, the adjacent boards 113 are fixed to each other and are electrically connected to each other.

With this configuration of the input device 100 of the present embodiment, the adjacent boards 113 are fixed to each other and electrically connected to each other at the same time by soldering the corresponding connectors 117 to each other. Accordingly, this configuration of the input device 100 makes it possible to easily assemble the detector 110.

In the input device 100 of the present embodiment, each connector 117 is formed by dividing a through hole formed across two boards 113 along the edges of the boards 113.

This configuration of the input device 100 of the present embodiment makes it possible to use parts of the boards 113 as the connectors 117 and thereby eliminates the need to provide separate components for the connectors 117. Accordingly, this configuration of the input device 100 makes it possible to easily manufacture and assemble the detector 110.

The input device 100 of the present embodiment further includes the circuit board 105 on which the detector 110 is mounted. The detector 110 is electrically connected to the circuit board 105 via one or more of the connectors 117 provided at an edge of one or more of the boards 113 that faces the surface of the circuit board 105.

With this configuration of the input device 100 of the present embodiment, the detector 110 is fixed to the circuit board 105 and electrically connected to the circuit board 105 at the same time by soldering the connectors 117 to the circuit board 105. Accordingly, this configuration of the input device 100 makes it possible to easily mount the detector 110 on the circuit board 105.

The embodiment of the present invention is described above. However, the present invention is not limited to the specifically disclosed embodiment, and variations and modifications may be made without departing from the scope of the present invention.

For example, the shape of the base 112 is not limited to a regular hexahedral shape, and the base 112 may have any other polyhedral shape. For example, the base 112 may have a regular polyhedral shape other than the regular hexahedral shape or may have a polyhedral shape other than the regular polyhedral shape.

Also, the guide 130 may not necessarily have a shape that covers the entire detector 110 as illustrated in FIGS. 1 and 9 as long as the guide 130 surrounds the detector 110 and can guide input operations performed by the operator 10. For example, the guide 130 may be formed of a rod-shaped component or a net-shaped component.

In the above-described embodiment, one detection electrode 114 is provided on each outer surface of the base 112. However, the present invention is not limited to this configuration. For example, multiple detection electrodes 114 may be provided on each outer surface of the base 112. This configuration makes it possible to increase the number of detection electrodes 114, assign a smaller detection range to each of the detection electrodes 114, and thereby improve the accuracy in detecting the position of the operator 10.

In the above-described embodiment, the guide 130 is elastically deformable. However, the guide 130 may be configured to be not elastically deformable.

An aspect of this disclosure makes it possible to easily adapt an input device capable of receiving three-dimensional input operations for various purposes.

What is claimed is:

1. An input device, comprising:
    a detector that includes
        a base having a polyhedral shape, and
        detection electrodes that are provided on some or all sides of the base and detect proximity of an operator, the base being formed by three-dimensionally assembling multiple flat boards on which the detection electrodes are provided;
    a guide that has a shape surrounding the detector and guides an input operation performed by the operator; and
    another board on which the detector is mounted, wherein
    each board of the boards includes connectors formed along a periphery of the board; and
    the detector is electrically connected to the another board via one or more of the connectors provided at an edge of at least one of the boards, the edge facing a surface of the another board.

2. The input device as claimed in claim 1, wherein the guide has a shape that covers the base.

3. The input device as claimed in claim 2, wherein the guide has a dome shape.

4. The input device as claimed in claim 1, wherein the guide is elastically deformable.

5. The input device as claimed in claim 1, wherein
    the base has a configuration where the connectors of the board are soldered to the connectors of an adjacent board of the boards that is adjacent to the board such that the board and the adjacent board are fixed to each other and are electrically connected to each other.

6. The input device as claimed in claim 1, wherein each of the connectors has a shape formed by dividing a through hole along the periphery.

7. The input device as claimed in claim 1, wherein the base has a regular polyhedral shape.

8. The input device as claimed in claim 7, wherein the base has a regular hexahedral shape.

9. An input device, comprising:
    a base having a polyhedral shape;
    detection electrodes that are provided on some or all sides of the base and detect proximity of an operator, the base being formed of multiple boards that are three-dimensionally assembled and on which the detection electrodes are provided; and
    another board on which the base is mounted, wherein
    each board of the boards includes connectors formed along a periphery of the board; and
    the base is electrically connected to the another board via one or more of the connectors provided at an edge of at least one of the boards, the edge facing a surface of the another board.

* * * * *